(12) United States Patent
Wu et al.

(10) Patent No.: US 11,874,515 B2
(45) Date of Patent: Jan. 16, 2024

(54) ELECTRONIC DEVICE

(71) Applicant: Advanced Semiconductor Engineering, Inc., Kaohsiung (TW)

(72) Inventors: Po-I Wu, Kaohsiung (TW); Ming-Fong Jhong, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 42 days.

(21) Appl. No.: 17/588,105

(22) Filed: Jan. 28, 2022

(65) Prior Publication Data
US 2023/0244049 A1   Aug. 3, 2023

(51) Int. Cl.
*G02B 6/43* (2006.01)
*G02B 6/42* (2006.01)

(52) U.S. Cl.
CPC ............ *G02B 6/43* (2013.01); *G02B 6/4277* (2013.01); *G02B 6/4284* (2013.01)

(58) Field of Classification Search
None
See application file for complete search history.

(56) References Cited

U.S. PATENT DOCUMENTS

| 8,860,532 | B2 | 10/2014 | Gong et al. |
| 10,938,082 | B2 * | 3/2021 | Rogers ................ H01Q 21/065 |
| 10,971,806 | B2 * | 4/2021 | Rogers .................. H01Q 21/26 |
| 11,056,754 | B2 * | 7/2021 | Mai .......................... H01Q 1/38 |
| 2012/0293279 | A1 * | 11/2012 | Gong ....................... H01Q 9/32 333/202 |
| 2020/0212531 | A1 * | 7/2020 | Mai .......................... H01Q 1/50 |

FOREIGN PATENT DOCUMENTS

CN 202275943 U 6/2012

* cited by examiner

*Primary Examiner* — Jerry Rahll
(74) *Attorney, Agent, or Firm* — FOLEY & LARDER LLP

(57) ABSTRACT

The present disclosure relates to an electronic device that includes a waveguide, a plurality of transceiving portions over the waveguide, and a cavity between the waveguide and the transceiving portions and connecting the waveguide with the transceiving portions. The cavity is configured for resonating of an electromagnetic wave from the waveguide or the transceiving portions.

15 Claims, 10 Drawing Sheets

ELECTRONIC DEVICE

BACKGROUND

1. Technical Field

The present disclosure generally relates to an electronic device having a resonant cavity.

2. Description of the Related Art

Substrate integrated waveguide (SIW) technology is widely used in wireless transceiving devices (or wireless communication devices) to reduce signal loss (e.g., insertion loss and return loss).

To meet high-speed transmission requirements, transceiving portions (such as antennas) may be arranged in an array in an xy-coordinate plane, which means that a larger SIW should be used. As a result, the package size in the xy-coordinate plane may be increased, and thus the layout design flexibility may be diminished. In addition, it becomes more difficult to control the antenna impedance match with a larger SIW, and the antenna performance may be degraded.

SUMMARY

In some arrangements, an electronic device includes a waveguide, a plurality of transceiving portions over the waveguide, and a cavity between the waveguide and the transceiving portions and connecting the waveguide with the transceiving portions. The cavity is configured for resonating of an electromagnetic wave from the waveguide or the transceiving portions.

In some arrangements, an electronic device includes a waveguide having an opening, a plurality of transceiving portions over the waveguide, and a cavity between the waveguide and the transceiving portions. A distance between the opening and a first one of the plurality of transceiving portions and a distance between the opening and a second one of the plurality of transceiving portions are substantially equal.

In some arrangements, an electronic device includes a carrier having a first surface, a second surface opposite to the first surface, an antenna adjacent to the second surface, a waveguide, and a resonant cavity disposed between the antenna and the waveguide. The electronic device also includes an electronic component disposed on the first surface of the carrier and configured to communicate with the antenna by the resonant cavity and the waveguide.

BRIEF DESCRIPTION OF THE DRAWINGS

Aspects of the present disclosure are readily understood from the following detailed description when read with the accompanying figures. It should be noted that various features may not be drawn to scale. The dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
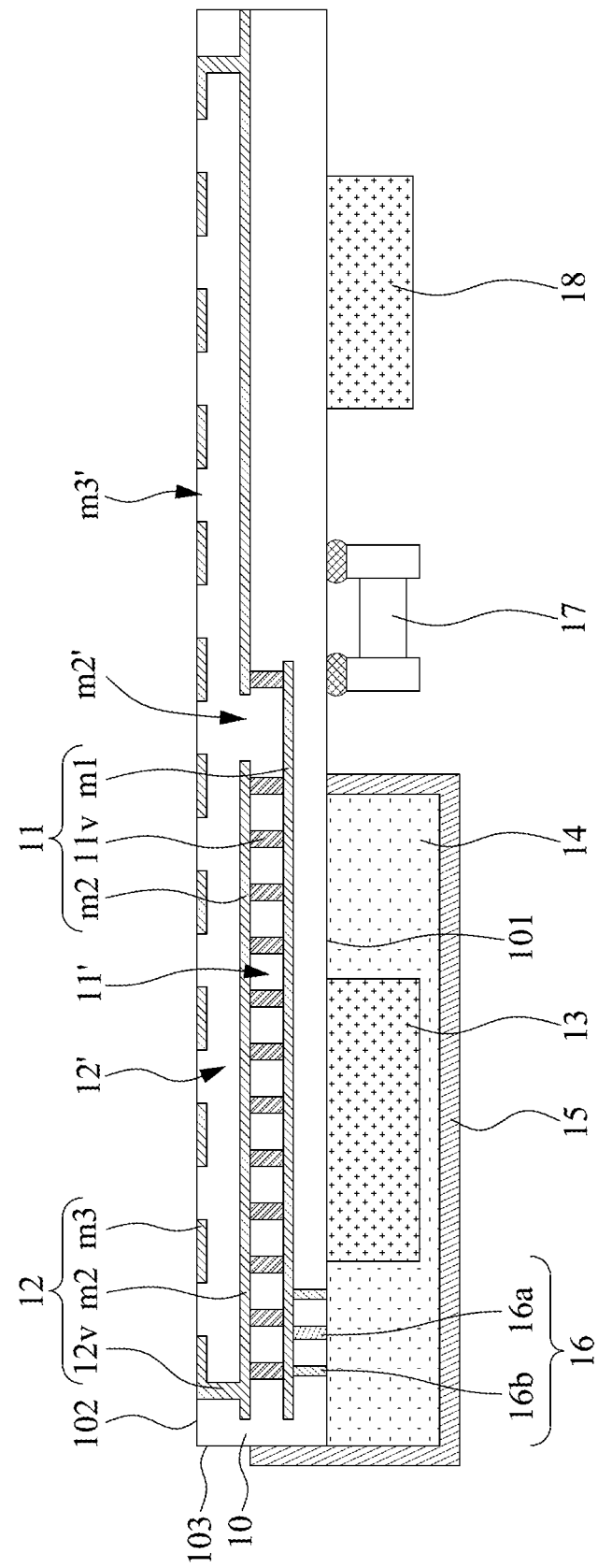
FIG. 1 illustrates a cross-sectional view of an electronic device in accordance with some arrangements of the present disclosure.

The following disclosure provides for many different arrangements, or examples, for implementing different features of the provided subject matter. Specific examples of components and arrangements are described below. These are, of course, merely examples and are not intended to be limiting. In the present disclosure, reference to the formation of a first feature over or on a second feature in the description that follows may include arrangements in which the first and second features are formed in direct contact, and may also include arrangements in which additional features may be formed between the first and second features, such that the first and second features may not be in direct contact. Besides, the present disclosure may repeat reference numerals and/or letters in the various examples. This repetition is for simplicity and clarity and does not in itself dictate a relationship between the various arrangements and/or configurations discussed.

Embodiments of the present disclosure are discussed in detail below. It should be appreciated, however, that the present disclosure provides many applicable concepts that can be embodied in a wide variety of specific contexts. The specific arrangements discussed are merely illustrative and do not limit the scope of the disclosure.

FIG. 1 illustrates a cross-sectional view of an electronic device 1 in accordance with some arrangements of the present disclosure. In some arrangements, the electronic device 1 may include a semiconductor device or a semiconductor device package. In some arrangements, the electronic device 1 may include a wireless transceiving device or a wireless communication device. In some arrangements, the electronic device 1 may be configured to be operated with electromagnetic waves or electromagnetic signals at appropriate radio wavelengths, such as microwave, millimeter wave, or submillimeter wave. In some arrangements, the electronic device 1 may include a carrier 10, a waveguide 11, a resonator 12, electronic components 13, 17, an encapsulant 14, a shielding layer 15, and connectors 16, 18.

In some arrangements, the carrier 10 may be or include a substrate, such as a dielectric substrate or a semiconductor substrate. In some arrangements, the waveguide 11 and the resonator 12 may be disposed within the carrier 10. In some arrangements, the waveguide 11 and the resonator 12 may be formed or integrated within the carrier 10.

In some arrangements, the carrier 10 may have a surface 101, a surface 102 opposite to the surface 101, and a surface 103 (also referred to as a lateral surface of the carrier 10) extending between the surface 101 and the surface 102. In some arrangements, the surface 103 may be angled or nonparallel with respect to the surface 101 and/or the surface 102. In some arrangements, the surface 101 may be a feeding side of the electronic device 1 and the surface 102 may be a transceiving side or an antenna side of the electronic device 1.

In some arrangements, the carrier 10 may include conductive layers m1, m2, m3 and conductive vias 11v, 12v. In some arrangements, the carrier 10 may further include other conductive structures, such as one or more of a redistribution layer (RDL), a ground layer or a grounding element, a feeding line, and a conductive transmission line.

In some arrangements, the carrier 10 may further include one or more dielectric layers (not annotated in the figures) surrounding or covering each of the conductive layers m1, m2, and m3 and the conductive vias 11v and 12v. In some arrangements, the conductive layers m1, m2, and m3 may be surrounded or covered by the same single dielectric layer. In some arrangements, the conductive layers m1, m2, and m3 may be surrounded or covered by a plurality of different dielectric layers.

In some arrangements, the conductive layers m1, m2, and m3 may be disposed at different elevations with respect to the surface 102 of the carrier 10. In some arrangements, the conductive layer m3 may be disposed adjacent to the surface 102 of the carrier 10. The conductive layer m3 may be disposed over the conductive layer m2. The conductive layer m2 may be disposed over the conductive layer m1. The conductive layer m2 may be disposed between the conductive layer m3 and the conductive layer m1. In some arrangements, any two of the conductive layer m3, the conductive layer m2, and the conductive layer m1 may be at least partially overlapped in a direction substantially perpendicular to the surface 101 and/or the surface 102 of the carrier 10.

In some arrangements, the conductive layers m1, m2, and m3 may each include a conductive material such as a metal or metal alloy. Examples of the conductive material include gold (Au), silver (Ag), aluminum (Al), copper (Cu), or an alloy thereof.

In some arrangements, one or more dielectric layers may be disposed between the conductive layer m1 and the conductive layer m2. In some arrangements, one or more dielectric layers may be disposed between the conductive layer m2 and the conductive layer m3. In some arrangements, the conductive layers m1, m2, and m3 may each have a pattern, which will be further described below.

In some arrangements, the conductive via 11v may connect or extend between the conductive layer m1 and the conductive layer m2. In some arrangements, the conductive via 11v may transverse or penetrate through the dielectric material between the conductive layer m1 and the conductive layer m2. In some arrangements, the conductive vias 11v may be spaced from one another by a gap. In some arrangements, the gap may be smaller than the wavelength of electromagnetic waves that the electronic device 1 is configured to be operated with. In some arrangements, the conductive via 11v may be angled with (such as perpendicular to) the conductive layer m1 and the conductive layer m2.

In some arrangements, the conductive via 12v may connect or extend between the conductive layer m2 and the conductive layer m3. In some arrangements, the conductive via 12v may transverse or penetrate through the dielectric material between the conductive layer m2 and the conductive layer m3. In some arrangements, the conductive vias 12v may be spaced from one another by a gap. In some arrangements, the gap may be smaller than the wavelength of electromagnetic waves that the electronic device 1 is configured to be operated with. In some arrangements, the conductive via 12v may be angled with (such as perpendicular to) the conductive layer m2 and the conductive layer m3.

In some arrangements, the conductive vias 11v and the conductive vias 12v may each include a cylindrical or a tapered profile in a cross-sectional view. In some arrangements, the conductive vias 11v and the conductive vias 12v may each include a conductive wall. For example, a conductive wall may continuously surround sides of the waveguide 11 and/or the resonator 12. For example, the lateral boundary of the waveguide 11 and/or the resonator 12 may be a continuous conductive wall.

In some arrangements, the conductive vias 11v and/or the conductive vias 12v may be connected to a common voltage. In some arrangements, the conductive vias 11v and/or the conductive vias 12v may be connected to ground. For example, the conductive layer m1, the conductive layer m2, and/or the conductive layer m3 may function as a grounding layer. For example, a grounding element may be at the same elevation with the conductive layer m1, the conductive layer m2, and/or the conductive layer m3.

In some arrangements, the conductive layer m1, the conductive layer m2, and the conductive via 11v may define the boundary of the waveguide 11. In some arrangements, a region of the dielectric material of the carrier 10 enclosed by the conductive layer m1, the conductive layer m2, and the conductive via 11v may be an interior 11' of the waveguide 11.

In some arrangements, the waveguide 11 may be disposed between the resonator 12 and the electronic component 13. In some arrangements, the waveguide 11 may be connected between the resonator 12 and the electronic component 13. In some arrangements, the waveguide 11 may include a substrate integrated waveguide (SIW) or other three-dimensional structure for transmitting guiding, propagating and/or directing electromagnetic waves between the resonator 12 and the electronic component 13.

In some arrangements, the waveguide 11 may be operatively coupled to the connector 16 through, for example, a port in the conductive layer m1. In some arrangements, the waveguide 11 may be electrically connected with the electronic component 13 through the connector 16. For example, the connector 16 may be configured to feed electromagnetic waves from the electronic component 13 into the waveguide 11, and vice versa.

In some arrangements, the waveguide 11 may be operatively coupled to the resonator 12. For example, the waveguide 11 may be operatively coupled to the resonator 12 through an opening m2' of the conductive layer m2. For example, the opening m2' may connect the waveguide 11 with the resonator 12. For example, the opening m2' may connect the interior 11' of the waveguide 11 with a cavity 12' (further described below) of the resonator 12. For example, the opening m2' may be configured to couple electromagnetic waves from the waveguide 11 into the resonator 12, and vice versa.

In some arrangements, the conductive layer m2, the conductive layer m3, and the conductive via 12v may define the boundary of the resonator 12. In some arrangements, a region of the dielectric material enclosed by the conductive layer m2, the conductive layer m3, and the conductive via 12v may be the cavity 12' of the resonator 12. The cavity 12' of the resonator 12 may be connected to the interior 11' of the waveguide 11 through the opening m2' of the conductive layer m2.

Figure 2A:
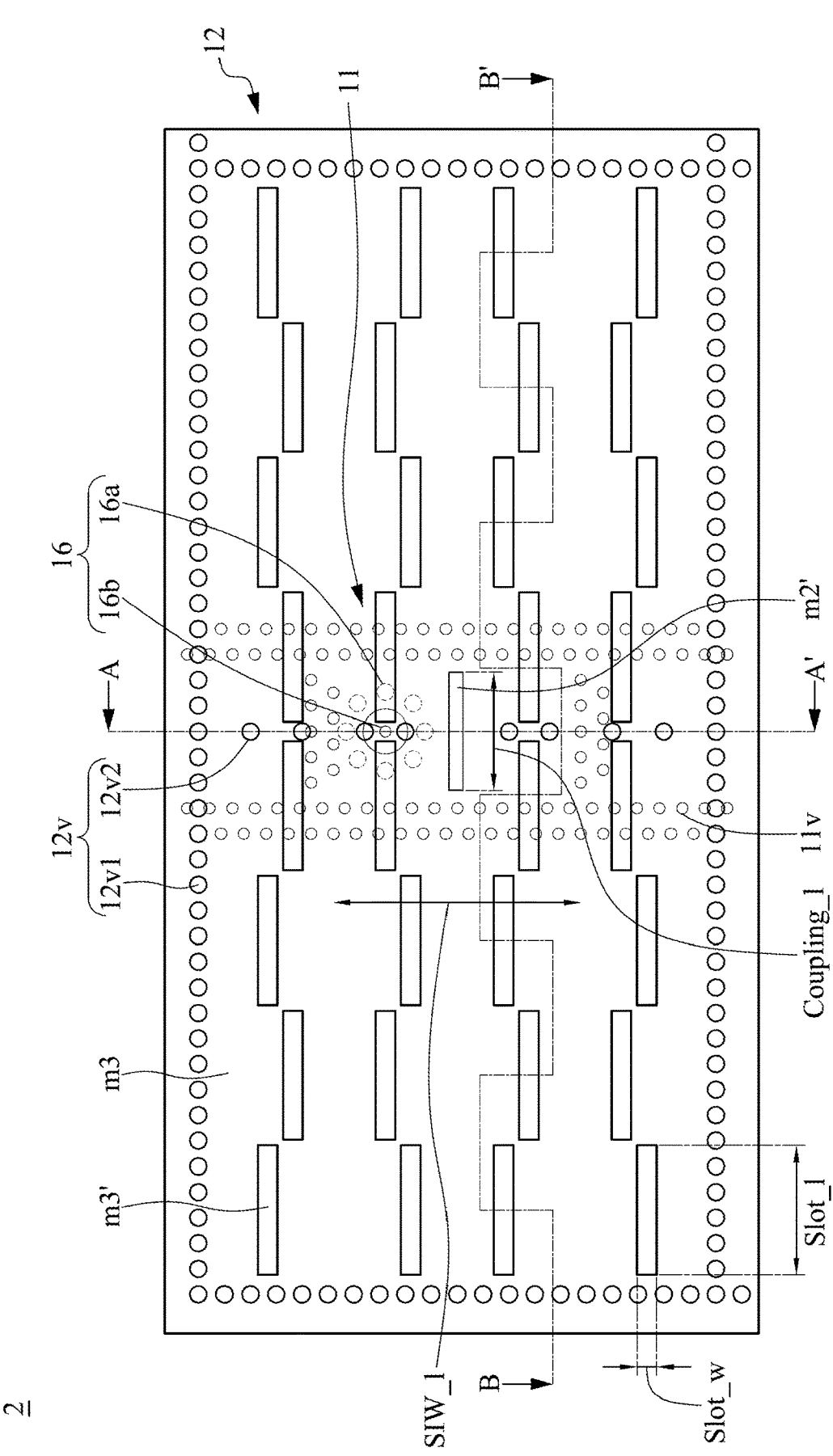
FIG. 2A illustrates a top view of an electronic device in accordance with some arrangements of the present disclosure.

In some arrangements, the conductive layer m2 may have a single opening m2' for connecting the interior 11' of the waveguide 11 and the cavity 12' of the resonator 12. In some arrangements, the opening m2' may be substantially aligned with a geometric center of the cavity 12' of the resonator 12 in a cross-sectional view (as shown in FIG. 1) and/or a top view (as shown in FIG. 2A). However, in some other arrangements, the conductive layer m2 may have a plurality of openings. In addition, in some other arrangements, the openings may be disposed at any location in the conductive layer m2.

In some arrangements, the conductive layer m3 may include one or more slots m3'. The slots m3' may be arranged in an array. In some arrangements, the slots m3' may define a plurality of transceiving portions (e.g., antennas or antenna patterns) of the electronic device 1. In some arrangements, the transceiving portions may be arranged in an array. For example, the slots m3' may define an antenna array including a plurality of antenna elements, such as slot antennas. In some other arrangements, a variety of other antenna elements can be used in the electronic device 1, such as patch antennas, chip antennas, and wire antennas, depending on the design preference and application. In some arrangements, two of the slots m3' may be arranged symmetrically with respect to the opening m2'. For example, the two of the slots m3' may be spaced apart from the opening m2' by the same distance. For example, a distance between a slot on the left and the opening m2' and a distance between a slot on the left and the opening m2' are substantially equal. For example, the two of the slots m3' may be disposed on opposite sides of the opening m2' from a top view.

In some arrangements, the slots m3' may be filled with the dielectric material of the carrier 10. In some arrangements, the surface 102 of the carrier 10 may be substantially coplanar with a surface (facing away from the conductive layer m2) of the conductive layer m3.

In some arrangements, the slots m3' may be configured to receive and/or radiate electromagnetic waves. In some arrangements, electromagnetic waves may be radiated from the slots m3' substantially at the same time.

In some arrangements, the transceiving portions defined by the slots m3' may be integrated into the resonator 12. In some arrangements, the transceiving portions defined by the slots m3' may be connected with the cavity 12' of the resonator 12. In some arrangements, the cavity 12' of the resonator 12 may be disposed between the transceiving portions defined by the slots m3' and the waveguide 11. In some arrangements, the cavity 12' of the resonator 12 may connect the transceiving portions defined by the slots m3' with the waveguide 11.

In some arrangements, the transceiving portions defined by the slots m3' may be adjacent to the surface 102 of the carrier 10. In some arrangements, the transceiving portions defined by the slots m3', the cavity 12' of the resonator 12, and the waveguide 11 may be disposed at different elevations with respect to the surface 102 of the carrier 10. In some arrangements, the transceiving portions defined by the slots m3' may be disposed over the waveguide 11 and/or the cavity 12' of the resonator 12.

In some arrangements, the cavity 12' of the resonator 12 may function as or be configured to define a resonant cavity for electromagnetic waves from the waveguide 11 and/or from the transceiving portions defined by the slots m3'. For example, the cavity 12' of the resonator 12 may be configured to allow electromagnetic waves transmitting between the waveguide 11 and the transceiving portions defined by the slots m3' to resonate therein. In some arrangements, the resonant frequency of the resonant cavity may be determined by the shape of the resonant cavity, the arrangement of the one or more conductive vias 12v, and/or the field distribution of the electromagnetic waves therein.

In some arrangements, the electronic component 13 and the electronic component 17 may be disposed on the surface 101 of the carrier 10. In some other arrangements, the electrical connection between the electronic component 13 (or the electronic component 17) and the carrier 10 may be attained by way of flip-chip, wire-bonding, and so on.

In some arrangements, the electronic component 13 may be electrically connected with the waveguide 11 through the connector 16. In some arrangements, the connector 16 may include a coaxial connector. In some arrangements, the connector 16 may include a conductive via 16a and one or more grounding elements 16b surrounding the conductive via 16a. In some arrangements, the conductive via 16a may be at least partially within the carrier 10. In some arrangements, the grounding elements 16b may be at least partially within the carrier 10.

In some arrangements, the electronic component 13 may be electrically connected with the carrier 10, the electronic component 17, the connector 18, and/or other components through a conductive transmission line, such as a microstrip line in the carrier 10.

In some arrangements, the electronic component 13 and the electronic component 17 may each be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some arrangements, the electronic component 13 may include a processing unit. In some arrangements, the electronic component 13 may include one or more of a radio frequency (RF) integrated circuit (IC), an analog-to-digital (A/D) converter, a digital-to-analog (D/A) converter, a filter, a low noise amplifier (LNA), a power amplifier, a multiplexer, a demultiplexer, a modulator, a demodulator, and so on.

In some arrangements, the electronic component 13 and/or the electronic component 17 may communicate with the transceiving portions defined by the slots m3' by the resonator 12 and the waveguide 11.

Although there are two electronic components 13 and 17 in FIG. 1, the number of the electronic components is not limited thereto. In some arrangements, there may be any number of electronic components in the electronic device 1, depending on design requirements.

In some arrangements, the encapsulant 14 may be disposed on the surface 101 of the carrier 10 and cover the electronic component 13. In some arrangements, the encapsulant 14 may include an epoxy resin having fillers, a molding compound (e.g., an epoxy molding compound or other molding compound), a polyimide, a phenolic compound or material, a material with a silicone dispersed therein, or a combination thereof.

In some arrangements, the shield layer 15 may be disposed on one or more external surfaces of the encapsulant 14. In some embodiments, the shield layer 15 may be configured to provide electromagnetic interference (EMI) shielding protection for the electronic component 13. For example, the shield layer 15 may be configured to provide an EMI shielding to prevent the electronic component 13 from being interfered with by other electronic components, and vice versa.

In some arrangements, the shield layer 15 may extend along the surface 103 of the carrier 10 and be electrically connected with a grounding layer or a grounding element exposed from the surface 103 of the carrier 10.

In some embodiments, the shield layer 15 may include copper (Cu) or other conductive materials, such as aluminum (Al), chromium (Cr), tin (Sn), gold (Au), silver (Ag), nickel (Ni) or stainless steel, another metal, or a mixture, an alloy, or other combinations of two or more thereof. In some embodiments, the shield layer 15 may be or include a conductive layer or a conductive thin film. In some embodiments, the shield layer 15 may be implemented using a conformal molding with a sputtered shield.

In some embodiments, the connector 18 may be disposed on the surface 101 of the carrier 10. In some embodiments, the connector 18 may provide electrical connections between the electronic device 1 and another electronic device or component external to the electronic device 1. The connector 18 may not be covered by the encapsulant 14. The connector 18 may be exposed from the encapsulant 14. The connector 18 may be spaced apart from the encapsulant 14. In some embodiments, the connector 18 may include a solder ball, such as a controlled collapse chip connection (C4) bump, a ball grid array (BGA) or a land grid array (LGA). In some embodiments, the connector 18 may include a cupper (Cu) pillar. In some embodiments, the connector 18 may include a coaxial connector.

In a comparative arrangement, the cavity 12' of the resonator 12 may be omitted and the transceiving portions defined by the slots m3' may be directly connected with the waveguide 11 (such as defined by the conductive layer m2). To meet the high-speed transmission requirements, the transceiving portions (such as antennas) may be arranged in an array in an xy-coordinate plane, which means that a larger waveguide should be used. Therefore, the package size in the xy-coordinate plane may be increased and the layout design flexibility may be diminished. In addition, it becomes more difficult to control the antenna impedance match with a larger waveguide, and the antenna performance may be degraded.

According to some arrangements of the present disclosure, by incorporating the cavity 12' of the resonator 12 with the waveguide 11, electromagnetic waves from the transceiving portions and/or from the waveguide 11 may resonate in the resonant cavity defined by the cavity 12' of the resonator 12, and thus the antenna performance may be enhanced. The package size of the electronic device 1 may be decreased since no larger waveguide is needed. Therefore, the layout design flexibility may be increased.

For example, electromagnetic waves from the electronic component 13 may be fed into the waveguide 11 through the connector 16, propagate in the interior 11' of the waveguide 11, be coupled into the resonator 12 through the opening m2', resonate in the resonant cavity defined by the cavity 12' of the resonator 12, and then be radiated through the slots m3'.

Similarly, electromagnetic waves received from the slots m3' may resonate in the resonant cavity defined by the cavity 12' of the resonator 12, be coupled into the waveguide 11 through the opening m2', propagate in the interior 11' of the waveguide 11, and then be transmitted into the electronic component 13 through the connector 16.

FIG. 2A illustrates a top view of an electronic device 2 in accordance with some arrangements of the present disclosure. In some arrangements, the same or similar elements in FIG. 1 and FIG. 2A are annotated with the same symbols, and the same or similar descriptions are not repeated hereafter for conciseness.

Figure 2B:
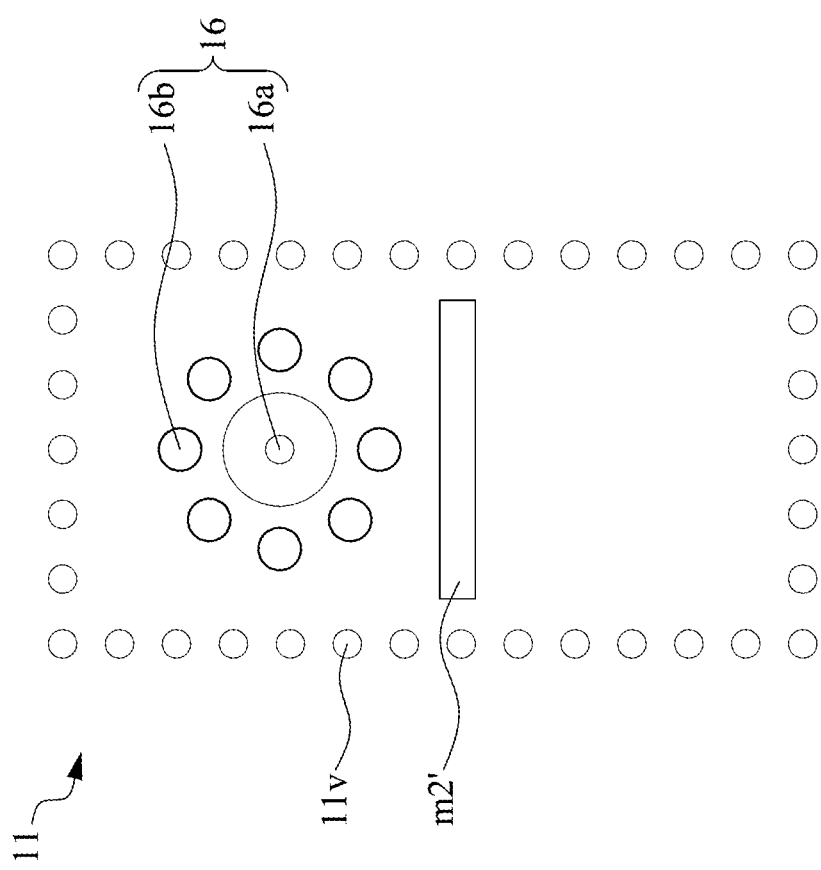
FIG. 2B illustrates a top view of a part of an electronic device in accordance with some arrangements of the present disclosure.
Figure 2C:
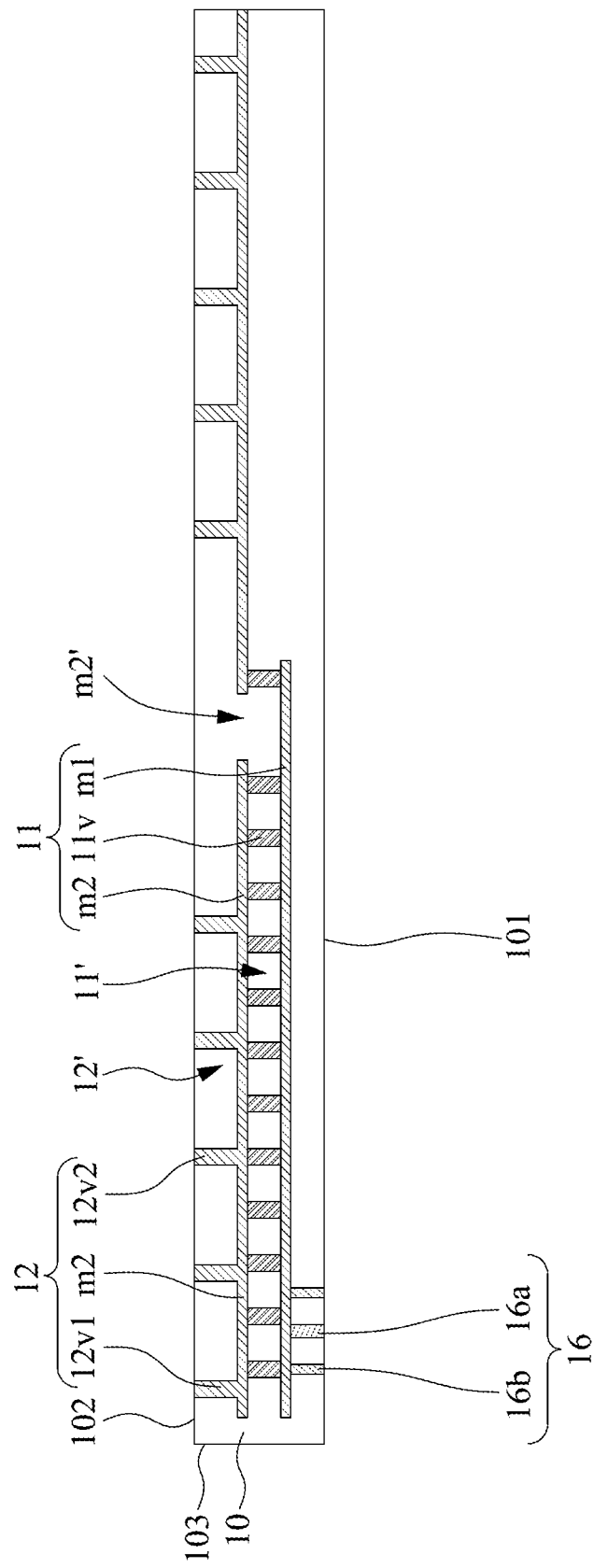
FIG. 2C illustrates a cross-sectional view of an electronic device in accordance with some arrangements of the present disclosure.
Figure 2D:
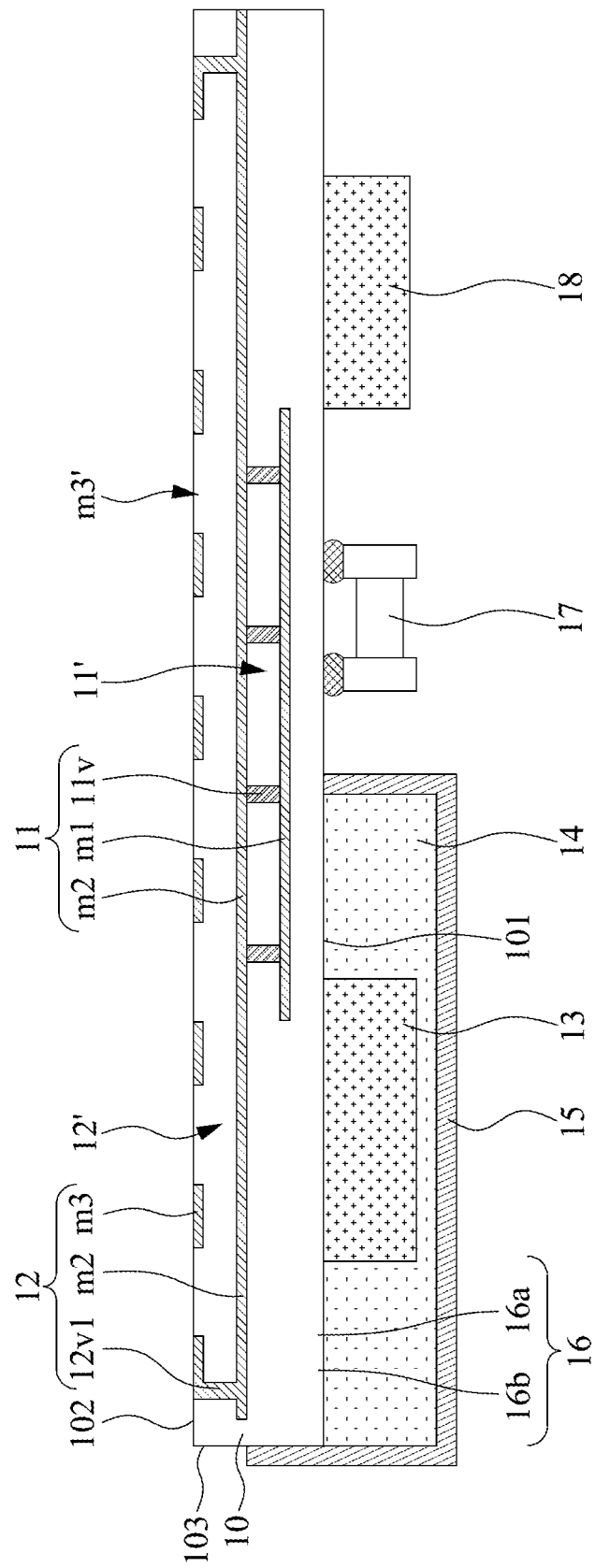
FIG. 2D illustrates a cross-sectional view of an electronic device in accordance with some arrangements of the present disclosure.

FIG. 2C illustrates a cross-sectional view of the electronic device 2 along the line AA' in FIG. 2A in accordance with some arrangements of the present disclosure. FIG. 2D illustrates a cross-sectional view of the electronic device 2 along the line BB' in FIG. 2A in accordance with some arrangements of the present disclosure.

Referring to FIGS. 2A, 2C, and 2D, the topmost layer may be the conductive layer m3. The slots m3' defined by the conductive layer m3 may be arranged in arrays along a latitudinal dimension (e.g., along or parallel to an X-axis) and a longitudinal dimension (e.g., along or parallel to a Y-axis). In some arrangements, the slots m3' may be arranged in an array. In some other arrangements, the slots m3' may be disposed randomly or arbitrarily.

In some arrangements, the slots m3' may each have a longer edge and a shorter edge. In some arrangements, the Slot_1 may represent the respective length dimension (such as the dimension along the longer edge) of the slots m3'. In some arrangements, the Slot_w may represent the respective width dimension (such as the dimension along the shorter edge) of the slots m3'.

The conductive vias 12v may be disposed beneath the conductive layer m3. The conductive vias 12v may include the conductive vias 12v1 disposed on the periphery of the resonator 12 and the conductive vias 12v2 surrounded by the conductive vias 12v1. In some arrangements, the conductive vias 12v1 may surround the slots m3' and the conductive vias 12v2 from a top view (as shown in FIG. 2A). In some arrangements, the conductive vias 12v1 may define the lateral boundary of the resonator 12. In some arrangements, the conductive vias 12v1 may define the lateral boundary of the cavity 12' (as shown in FIG. 2C) of the resonator 12. It is to be noticed that only the conductive vias 12v1 are illustrated in FIG. 1. However, the electronic device 1 in FIG. 1 may also include the conductive vias 12v2.

In some embodiments, the conductive vias 12v2 may be configured to distribute the electromagnetic waves to the slots m3'.

In some arrangements, the conductive vias 12v2 may be disposed along a symmetry line (such as the line AA') of the resonator 12. In some arrangements, there may be eight conductive vias 12v2 disposed along a symmetry line of the resonator 12. However, the number and the location of the conductive vias 12v2 may be adjusted based on the design requirements.

The conductive layer m2 (annotated in FIGS. 2C and 2D) may be disposed beneath the conductive vias 12v. The opening m2' of the conductive layer m2 may be disposed substantially aligned with a geometric center of the conductive layer m2 in a top view (as shown in FIG. 2A) and/or in a cross-sectional view (as shown in FIG. 1 and FIG. 2C).

The opening m2' of the conductive layer m2 may be disposed substantially aligned with a geometric center of the cavity 12' of the resonator 12 in a top view (as shown in FIG. 2A) and/or in a cross-sectional view (as shown in FIG. 1 and FIG. 2C).

In some arrangements, the opening m2' may have a longer edge and a shorter edge. In some arrangements, the longer edge of the opening m2' and the longer edge of the slots m3' may substantially extend along a same direction. In some arrangements, the Coupling_1 may represent the length dimension (such as the dimension along the longer edge) of the opening m2'. In some arrangements, in the extending direction, two adjacent slots m3' may be non-overlapping. In some arrangements, in the extending direction, two adjacent slots m3' may be spaced apart from each other. In some arrangements, in a direction perpendicular to the extending direction, two adjacent slots m3' may be non-overlapping. In some arrangements, in a direction perpendicular to the extending direction, two adjacent slots m3' may be spaced apart from each other.

The conductive vias 11v may be disposed beneath the conductive layer m2. In some arrangements, the conductive vias 11v may surround the opening m2' and the connector 16 in a top view (as shown in FIG. 2A). In some arrangements, the conductive vias 11v may define the lateral boundary of the waveguide 11. In some arrangements, the conductive vias 11v may define the lateral boundary of the interior 11'(as shown in FIG. 2C and FIG. 2D) of the waveguide 11. In some arrangements, the SIW_1 may represent a dimension of the waveguide 11.

In some arrangements, the waveguide 11 may be disposed within the lateral boundary of the resonator 12. For example, a projection of the waveguide 11 on the surface 101 and/or the surface 102 of the carrier 10 may be fully within a projection of the cavity 12' of the resonator 12 on the surface 101 and/or the surface 102 of the carrier 10. For example, a projection of the waveguide 11 on the surface 101 and/or the surface 102 of the carrier 10 may be fully surrounded by the conductive vias 12v1.

In some arrangements, the waveguide 11 may be disposed substantially aligned with a geometric center of the cavity 12' of the resonator 12 in a top view (as shown in FIG. 2A) and/or in a cross-sectional view (as shown FIG. 2D).

The conductive layer m1 (annotated in FIG. 2C and FIG. 2D) may be disposed beneath the conductive vias 11v. The connector 16 connected to a port in the conductive layer m1 may be surrounded by the conductive vias 11v in a top view (as shown in FIG. 2A).

In some arrangements, the opening m2' may be spaced part from the port of the waveguide 11 for connecting the connector 16 in a cross-sectional view (as shown in FIG. 1 and FIG. 2C) and/or a top view (as shown in FIG. 2A). For example, the input (e.g., the port of the waveguide 11 for connecting the connector 16) and output (e.g., the opening m2') of the waveguide 11 may be spaced part in a cross-sectional view (as shown in FIG. 1 and FIG. 2C) and/or a top view (as shown in FIG. 2A).

By arranging the opening m2' of the conductive layer m2 to be substantially aligned with a geometric center of the cavity 12' of the resonator 12, the waveguide 11 may be configured to transmit, guide, propagate and/or direct electromagnetic waves into the cavity 12' of the resonator 12 from a geometric center of the cavity 12' of the resonator 12. The electromagnetic waves may be evenly distributed to the slots m3', and the antenna gain may be increased.

FIG. 2B illustrates a top view of the waveguide 11 in accordance with some arrangements of the present disclosure. The waveguide 11 of FIG. 2B is similar to the waveguide 11 of FIG. 2A, and the differences therebetween are described below. In some arrangements, the waveguide 11 in FIG. 2B may be used in the electronic device 1 or the electronic device 2.

In the waveguide 11 of FIG. 2B, the lateral boundary of the waveguide 11 is defined by a single or an individual loop of the conductive vias 11v. In some arrangements, there may be any number of loops of the conductive vias 11v of the waveguide 11, depending on design requirements.

FIGS. 3A, 3B, 3C, 3D, and 3E each illustrate cross-sectional views of a part of an electronic device in accordance with some arrangements of the present disclosure. The configurations in FIGS. 3A, 3B, 3C, 3D, and 3E may be used in the electronic device 1 in FIG. 1 or the electronic device 2 in FIG. 2A. In some arrangements, the elements in each of 3A, 3B, 3C, 3D, and 3E, which are the same or similar to the elements described, are annotated with the same symbols, and the same or similar descriptions are not repeated hereafter for conciseness.

Figure 3A:
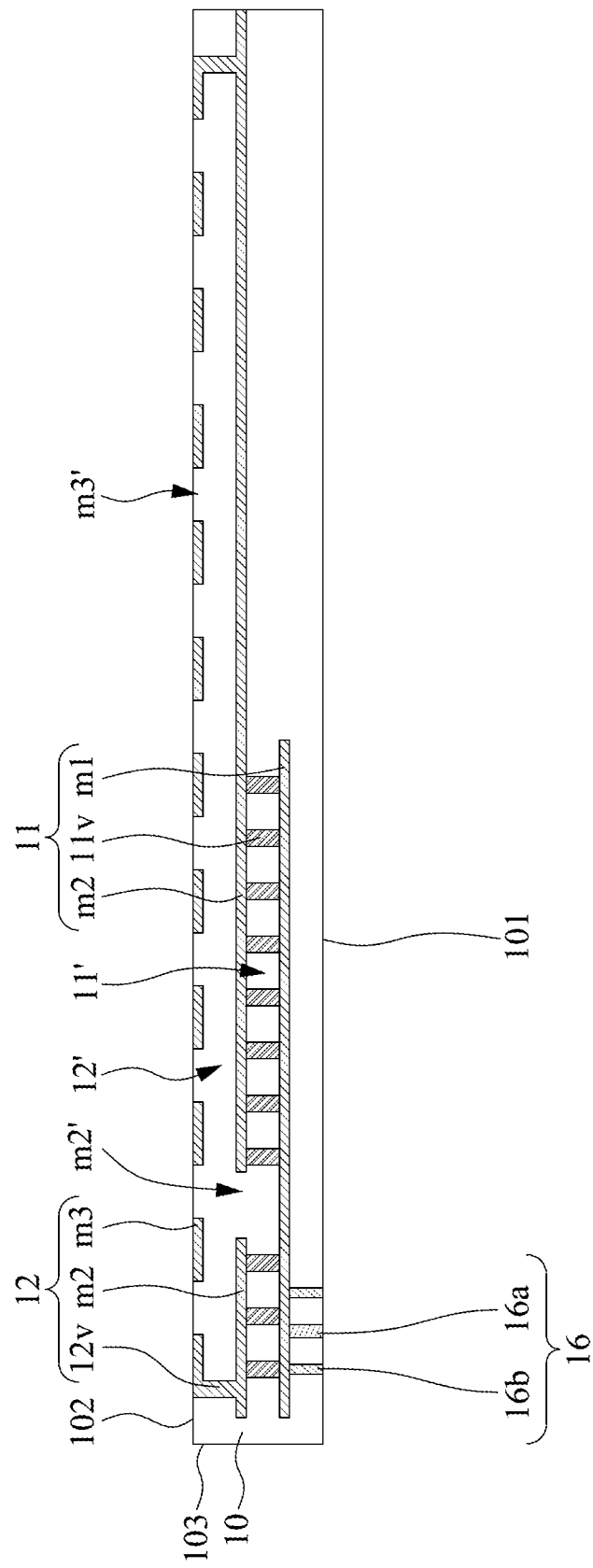
FIG. 3A illustrates a cross-sectional view of a part of an electronic device in accordance with some arrangements of the present disclosure.

Referring to FIG. 3A, in some arrangements, the opening m2' of the conductive layer m2 may be spaced apart from a geometric center of the cavity 12' of the resonator 12. For example, the opening m2' of the conductive layer m2 may not be disposed substantially aligned with a geometric center of the cavity 12' of the resonator 12.

Figure 3B:
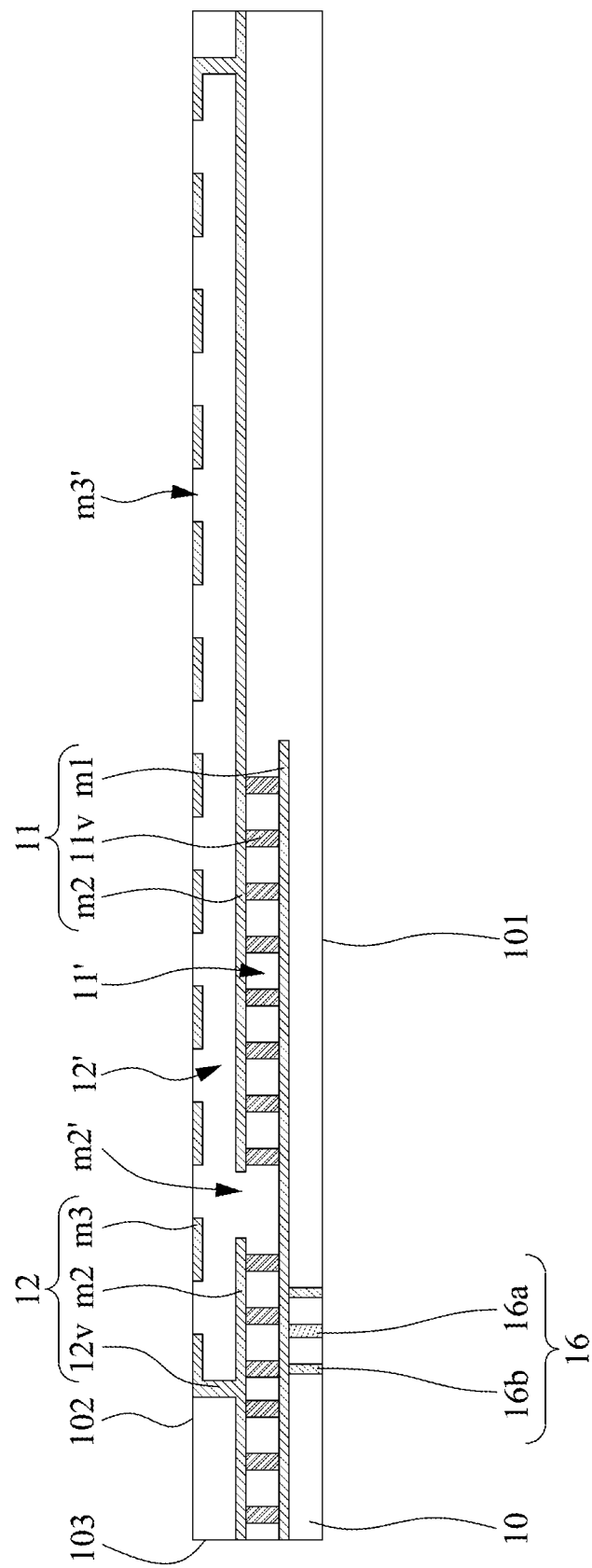
FIG. 3B illustrates a cross-sectional view of a part of an electronic device in accordance with some arrangements of the present disclosure.

Referring to FIG. 3B, in some arrangements, the waveguide 11 may be disposed partially within the lateral boundary of the resonator 12. For example, the waveguide 11 and the cavity 12' of the resonator 12 may be partially overlapping in a direction substantially perpendicular to the surface 101 and/or the surface 102 of the carrier 10. For example, a projection of the waveguide 11 on the surface 101 and/or the surface 102 of the carrier 10 may be partially within a projection of the cavity 12' of the resonator 12 on the surface 101 and/or the surface 102 of the carrier 10.

In FIG. 3A and FIG. 3B, the electromagnetic waves transmitted between the waveguide 11 and the cavity 12' of the resonator 12 may be propagated through the opening m2' in a direction substantially perpendicular to the surface 101 and/or the surface 102 of the carrier 10.

Figure 3C:
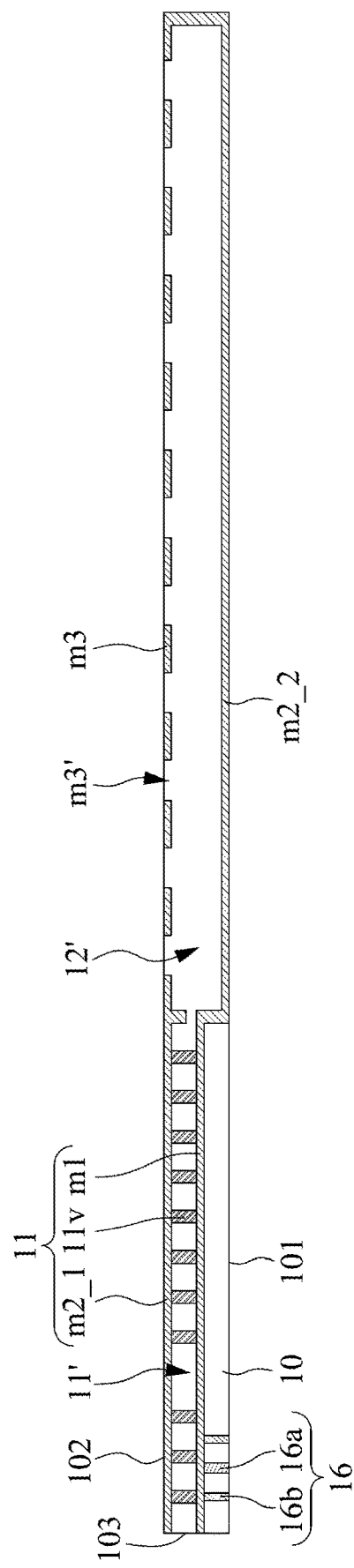
FIG. 3C illustrates a cross-sectional view of a part of an electronic device in accordance with some arrangements of the present disclosure.

Referring to FIG. 3C, the waveguide 11 may be defined by the conductive layer m1 and a conductive layer m2_1. The resonator 12 may be defined by the conductive layer m3 and a conductive layer m2_2. In some arrangements, the waveguide 11 and the resonator 12 may not be constructed by the same conductive layer m2.

In some arrangements, the waveguide 11 and the resonator 12 may be disposed side-by-side. For example, a projection of the waveguide 11 on the surface 101 and/or the surface 102 of the carrier 10 may not be within a projection of the cavity 12' of the resonator 12 on the surface 101 and/or the surface 102 of the carrier 10. For example, a projection of the waveguide 11 on the surface 101 and/or the surface 102 of the carrier 10 and a projection of the cavity 12' of the resonator 12 on the surface 101 and/or the surface 102 of the carrier 10 may be non-overlapping.

In some arrangements, the waveguide 11 and the cavity 12' of the resonator 12 may be overlapped in a direction substantially parallel to the surface 101 and/or the surface 102 of the carrier 10.

Figure 3D:
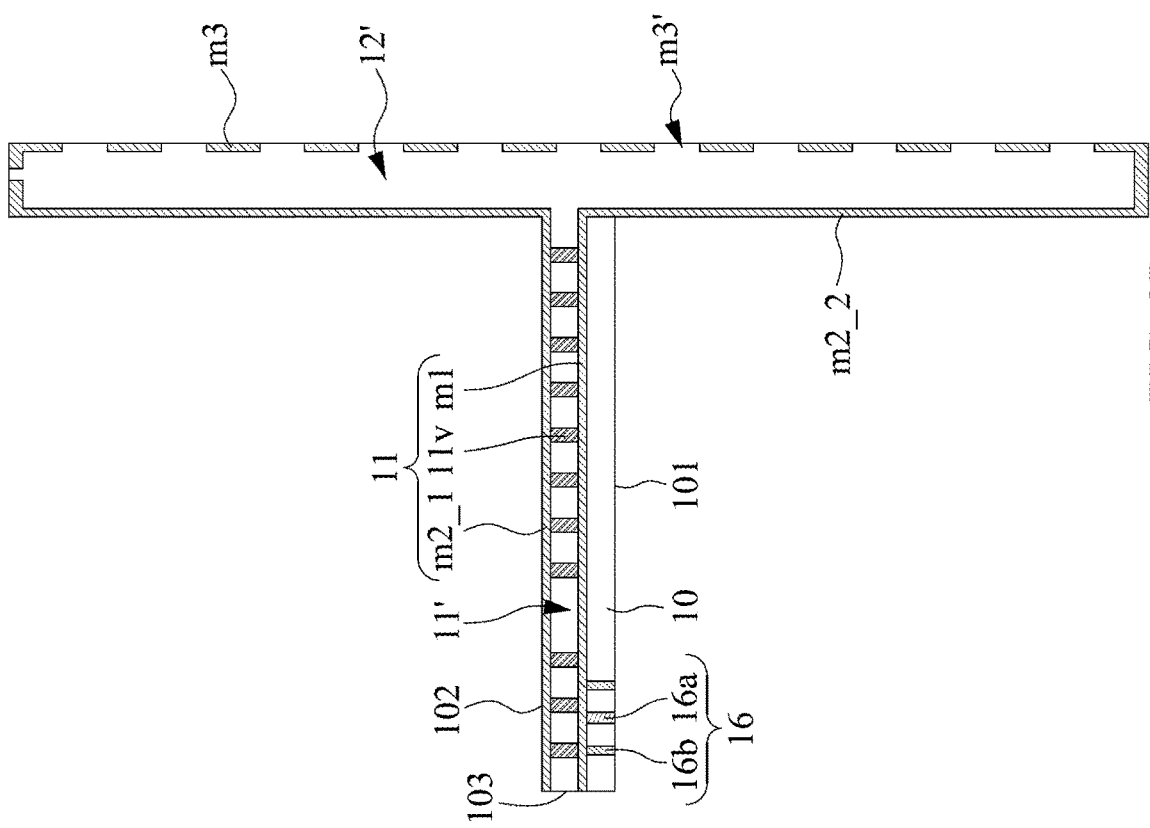
FIG. 3D illustrates a cross-sectional view of a part of an electronic device in accordance with some arrangements of the present disclosure.

Referring to FIG. 3D, the waveguide 11 may be defined by the conductive layer m1 and the conductive layer m2_1. The resonator 12 may be defined by the conductive layer m3 and the conductive layer m2_2.

In some arrangements, the waveguide 11 may be laterally connected to the conductive layer m2_2 of the resonator 12. For example, the conductive layer m1 and/or the conductive layer m2_1 of waveguide 11 may be substantially perpendicular to the conductive layer m2_2 of the resonator 12.

In FIG. 3C and FIG. 3D, the electromagnetic waves transmitted between the waveguide 11 and the cavity 12' of the resonator 12 may be propagated through the opening m2' in a direction substantially parallel to the surface 101 and/or the surface 102 of the carrier 10.

Figure 3E:
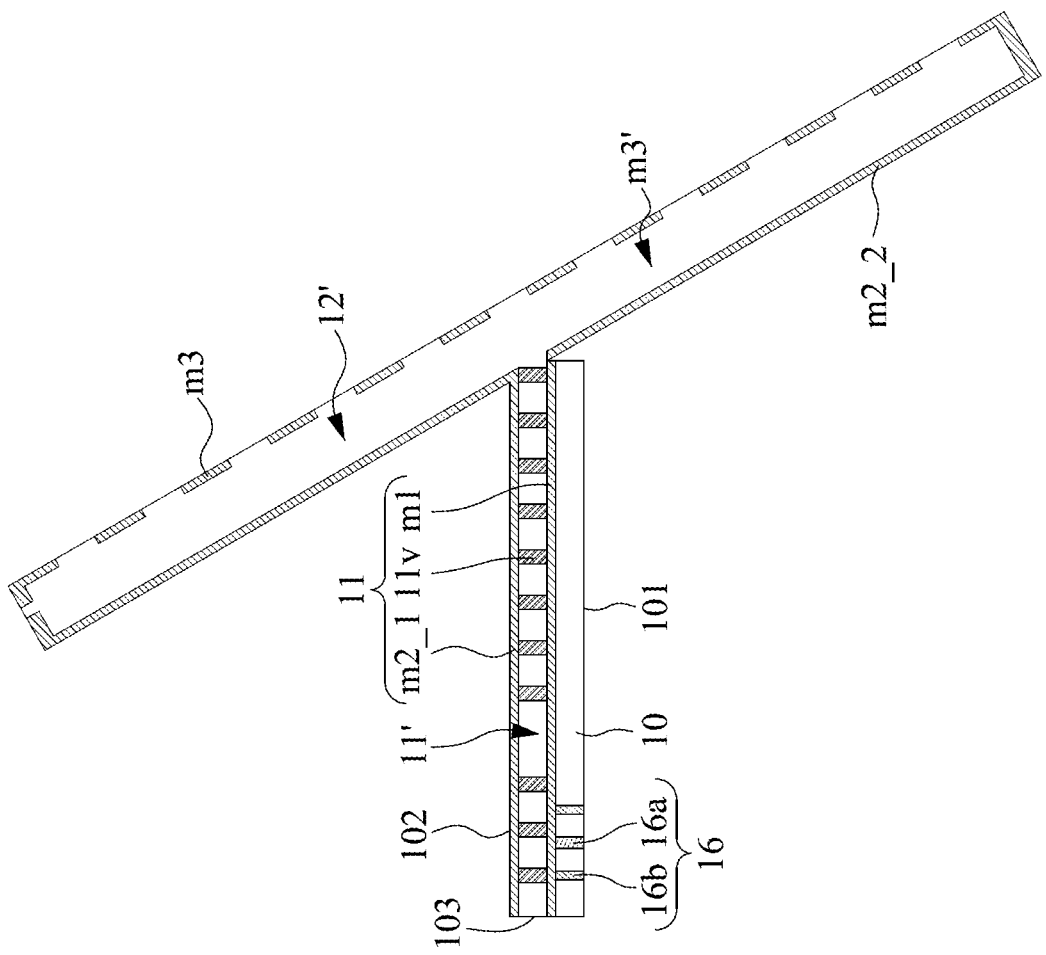
FIG. 3E illustrates a cross-sectional view of a part of an electronic device in accordance with some arrangements of the present disclosure.

Referring to FIG. 3E, in some arrangements, the conductive layer m1 and/or the conductive layer m2_1 of waveguide 11 may be angled with the conductive layer m2_2 of the resonator 12.

In some arrangements, the waveguide 11 and the cavity 12' of the resonator 12 may be at least partially overlapping in a direction substantially parallel to the surface 101 and/or the surface 102 of the carrier 10. In some arrangements, the waveguide 11 and the cavity 12' of the resonator 12 may be at least partially overlapping in a direction substantially perpendicular to the surface 101 and/or the surface 102 of the carrier 10.

In FIG. 3E, the electromagnetic waves transmitted between the waveguide 11 and the cavity 12' of the resonator 12 may be propagated through the opening m2' in an oblique direction with respect to the surface 101 and/or the surface 102 of the carrier 10.

Spatially relative terms, such as "beneath," "below," "lower," "above," "upper," "left," "right" and the like, may be used herein for ease of description to describe one element or feature's relationship to another element(s) or feature(s) as illustrated in the figures. The spatially relative terms are intended to encompass different orientations of the device in use or operation, in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

As used herein, the terms "approximately", "substantially", "substantial" and "about" are used to describe and account for small variations. When used in conduction with an event or circumstance, the terms can refer to instances in which the event or circumstance occurs precisely as well as instances in which the event or circumstance occurs to a close approximation. As used herein with respect to a given value or range, the term "about" generally means within ±10%, ±5%, ±1%, or ±0.5% of the given value or range. Ranges can be expressed herein as from one endpoint to another endpoint or between two endpoints. All ranges disclosed herein are inclusive of the endpoints unless specified otherwise. The term "substantially coplanar" can refer to two surfaces within micrometers (μm) of lying along the same plane, such as within 10 within 5 within 1 or within 0.5 μm of lying along the same plane. When referring to numerical values or characteristics as "substantially" the same, the term can refer to the values lying within ±10%, ±5%, ±1%, or ±0.5% of an average of the values.

The foregoing outlines features of several arrangements and detailed aspects of the present disclosure. The arrangements described in the present disclosure may be readily used as a basis for designing or modifying other processes and structures for carrying out the same or similar purposes and/or achieving the same or similar advantages of the arrangements introduced herein. Such equivalent constructions do not depart from the spirit and scope of the present disclosure, and various changes, substitutions, and alterations may be made without departing from the spirit and scope of the present disclosure.

What is claimed is:

1. An electronic device, comprising:
   a waveguide;
   a plurality of transceiving portions over the waveguide;
   a cavity between the waveguide and the transceiving portions and connecting the waveguide with the transceiving portions, wherein the cavity is configured for resonating of an electromagnetic wave from the waveguide or the transceiving portions; and
   a carrier, wherein the waveguide and the cavity are within the carrier,
   wherein the waveguide and the cavity are at least partially overlapping in a direction substantially perpendicular to a first surface of the carrier.

2. The electronic device of claim 1, further comprising an electronic component disposed on the first surface of the carrier and electrically connected to the waveguide, wherein the transceiving portions are adjacent to a second surface opposite to the first surface of the carrier.

3. The electronic device of claim 1, wherein the carrier comprises:
   a first conductive layer;
   a second conductive layer over the first conductive layer; and
   a plurality of conductive vias connecting the first conductive layer with the second conductive layer,
   wherein the first conductive layer, the second conductive layer, and the conductive vias define the waveguide.

4. The electronic device of claim 3, wherein the carrier further comprises a third conductive layer over the second conductive layer, and wherein the second conductive layer and the third conductive layer define the cavity.

5. The electronic device of claim 4, wherein the third conductive layer comprises a plurality of slots defining the transceiving portions.

6. The electronic device of claim 3, wherein the second conductive layer comprises an opening connecting the cavity with the waveguide.

7. The electronic device of claim 6, wherein the opening is substantially aligned with a geometric center of the cavity.

8. The electronic device of claim 1, wherein a geometric center of the cavity is substantially aligned with a geometric center of the waveguide.

9. The electronic device of claim 1, wherein a projection of the waveguide on the first surface of the carrier is partially within a projection of the cavity on the first surface of the carrier.

10. The electronic device of claim 1, wherein a projection of the waveguide on the first surface of the carrier and a projection of the cavity on the first surface of the carrier are non-overlapping.

11. The electronic device of claim 1, wherein the cavity is configured to allow the electromagnetic wave transmitting between the waveguide and the transceiving portions.

12. An electronic device, comprising:
    a waveguide having an opening;
    a plurality of transceiving portions over the waveguide; and
    a cavity between the waveguide and the transceiving portions,
    wherein a distance between the opening and a first one of the plurality of transceiving portions and a distance between the opening and a second one of the plurality of transceiving portions are substantially equal, wherein the opening is substantially aligned with a geometric center of the cavity.

13. The electronic device of claim 12, wherein the plurality of transceiving portions are defined by at least one slot, a longer edge of the opening extends along a direction, and a longer edge of the slot substantially extends along the direction.

14. The electronic device of claim 13, wherein two adjacent transceiving portions of the plurality of transceiving portions are non-overlapping along the direction.

15. An electronic device, comprising:
   a waveguide having an opening;
   a plurality of transceiving portions over the waveguide; and
   a cavity between the waveguide and the transceiving portions,
   wherein a distance between the opening and a first one of the plurality of transceiving portions and a distance between the opening and a second one of the plurality of transceiving portions are substantially equal,
   wherein the first one of the plurality of transceiving portions and the second one of the plurality of transceiving portions are substantially symmetrically with respect to the opening.

* * * * *